United States Patent
Martinez et al.

(10) Patent No.: US 11,769,145 B1
(45) Date of Patent: Sep. 26, 2023

(54) SIMULATIONS USING A TOKEN EXCHANGE SYSTEM

(71) Applicant: UIPCO, LLC, San Antonio, TX (US)

(72) Inventors: Noe Alberto Martinez, San Antonio, TX (US); Huihui Wu, Grapevine, TX (US); Steven Michael Bernstein, San Antonio, TX (US); Nickolaus Wayne O'Neal, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 2 days.

(21) Appl. No.: 17/559,003

(22) Filed: Dec. 22, 2021

(51) Int. Cl.
  *G06Q 20/38* (2012.01)
  *G06T 11/20* (2006.01)
  *G06N 20/00* (2019.01)

(52) U.S. Cl.
  CPC ......... *G06Q 20/381* (2013.01); *G06Q 20/389* (2013.01); *G06T 11/206* (2013.01); *G06N 20/00* (2019.01); *G06Q 2220/00* (2013.01)

(58) Field of Classification Search
  None
  See application file for complete search history.

(56) References Cited

U.S. PATENT DOCUMENTS

| | | | |
|---|---|---|---|
| 9,256,876 B2 * | 2/2016 | Vasant Akole | G06Q 20/405 |
| 11,393,022 B1 * | 7/2022 | Rai | G06N 20/00 |
| 2007/0198382 A1 * | 8/2007 | Ferrari | G06Q 40/00 705/35 |
| 2009/0063332 A1 * | 3/2009 | Tabaczynski | G06Q 30/02 705/39 |
| 2012/0290367 A1 * | 11/2012 | Scipioni | G06Q 20/105 705/14.1 |
| 2014/0122338 A1 * | 5/2014 | Cueli | G06Q 40/00 705/35 |
| 2017/0286929 A1 * | 10/2017 | Bodman | G06Q 20/102 |

* cited by examiner

*Primary Examiner* — Paul S Schwarzenberg
(74) *Attorney, Agent, or Firm* — Potomac Law Group, PLLC

(57) ABSTRACT

Aspects of the present disclosure are directed to techniques to simulate conditions while progressing towards a goal state using token conversions. Tokens can be assets associated with a defined goal and can be implemented to segment accounts for a defined purpose and to improve user planning. An account can be segmented by converting a portion of the user's account balance to tokens to progress towards the goal. In some implementations, a simulation can generate a target token conversion schedule that achieves a target number of tokens at a target date. However, user behavior can change the observed token amounts and cause deviations from the schedule. The simulations can alter the token conversion schedule and arrive at a new target date for the target number of tokens. In some implementations, automated agents and machine learning components can be used to implement the token tracking and simulations.

20 Claims, 9 Drawing Sheets

SIMULATIONS USING A TOKEN EXCHANGE SYSTEM

TECHNICAL FIELD

The present disclosure is directed to techniques to simulate conditions while progressing towards a goal state using token conversions.

BACKGROUND

User behavior can often be unpredictable, such as when a target is defined but progression towards the target presents challenges. For example, at times user's activities may not align with their self-defined goals. Different users can present different activity when progressing towards a target, and because of this conventional mitigation techniques have a limited impact. In addition, user circumstances can change such that an initial target is no longer practical. Online accounts can reflect user behavior and progression towards goals, but tend to have static resource allocations which are difficult to update and fail to provide clear boundaries between how resources are allocated.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
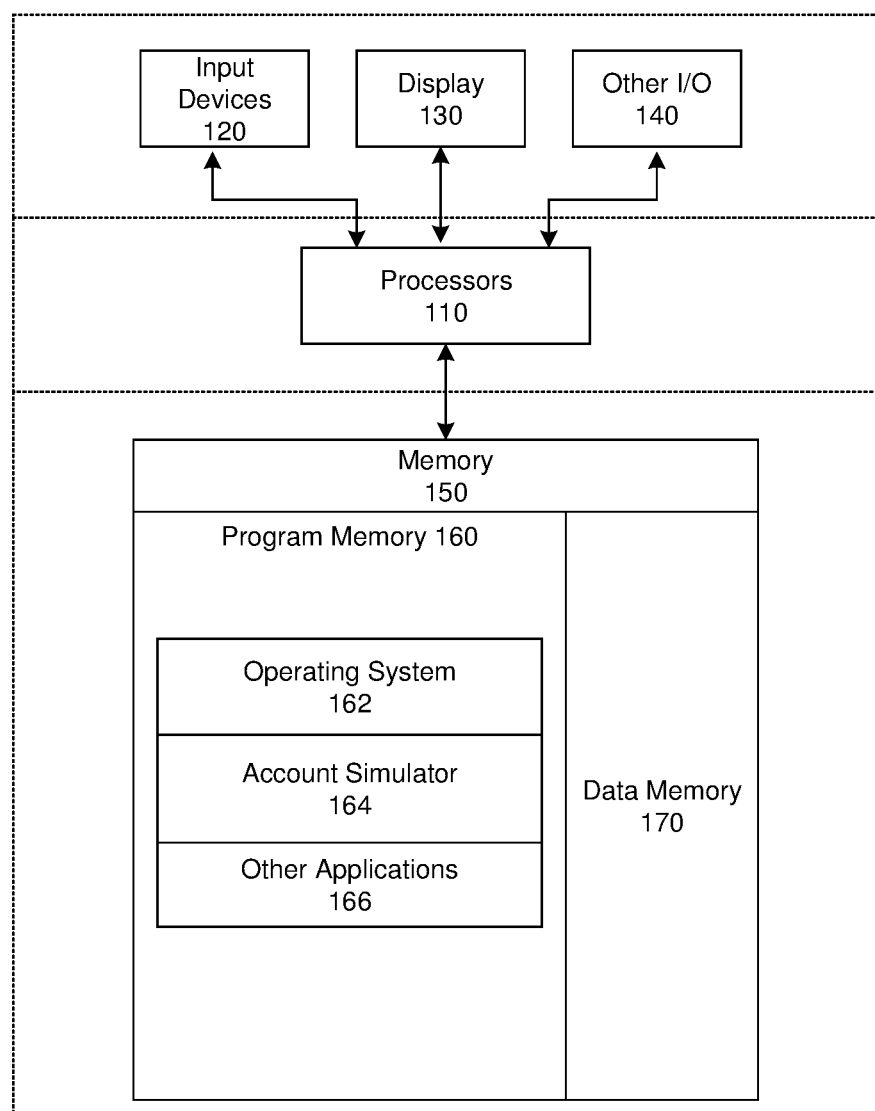
FIG. 1 is a block diagram illustrating an overview of devices on which some implementations can operate.

Aspects of the present disclosure are directed to techniques to simulate conditions while progressing towards a goal state using token conversions. In some implementations, a simulation can generate a target token conversion schedule that achieves a target number of tokens at a target date. However, user behavior can change the observed token amounts and cause deviations from the schedule. In some implementations, the simulations can alter the token conversion schedule and arrive at a new target date for the target number of tokens. In some implementations, machine learning components (e.g., a trained machine learning model) can be used to implement the simulations.

A goal can be a product, service, investment, or other suitable goal that corresponds to a number of tokens. Tokens can be generated by converting account balance. Tokens can represent a credit towards reaching a defined goal. In some implementations, a user can define or select a goal that corresponds to a number of tokens, and a token conversion schedule can be generated to reach the goal. For example, the token conversion schedule can define multiple token conversions, (e.g., conversions per week) to attain the goal number of tokens by a goal date.

A token conversion includes performing a transaction whereby resources in an account are used to acquire a corresponding amount of tokens. Sets of tokens can then be held in the account, separate from funds, with a designated purpose or user note. As non-monetary assets, tokens can be reserved outside the available account balance, while they can also be used to increase the account balance at instruction by the user or in response to a triggering event (e.g., the account balance going below a threshold).

In some implementations, conversions can be bidirectional (e.g., account balance can be converted to tokens and tokens can be converted to account balance). At times, user behavior (e.g., token conversions outside the token conversion schedule) can deviate from the defined schedule. For example, a user's circumstances may change such that a previously planned token conversion for a given week may no longer be practical. In this example, the user may initiate a manual conversion of tokens back to account balance and/or skip (or modify) a scheduled token conversion. Some token sets may not have a token conversion schedule, and a user may initiate one-time transfers to save towards the goal associated with these token sets.

In some implementations, simulations can modify the token conversion schedule based on observed deviations. For example, new token conversion amounts can be defined (e.g., per week) and a new goal date can be defined. In some implementations, the original token conversion schedule and modifications to the token conversion schedule can be generated to increase a likelihood of success (e.g., reaching the goal number of tokens by a given date or for another goal metric). For example, one or more machine learning models can be used to generate the original token conversion schedule and to make modifications to the token conversion schedule in the presence of deviations.

In some implementations, a machine learning model can be configured or trained to forecast a token conversion schedule for a defined goal and/or forecast modifications to a previously generated token conversion schedule. For example, the forecast can be based on features of: the user, the user's account, the goal, observed deviations from a token conversion schedule, or any other suitable features. In some implementations, the machine learning model can be trained using historic data that includes user data, user account data, goal data, token conversion schedule data, deviations data, and outcomes data (e.g., whether the goal was achieved, by the goal date, and user satisfaction).

Conventional systems implement soft planning (e.g., without token conversions) that fail to simulate account status while progressing towards a goal. For example, when soft planning is used, a user can readily deviate from the plan without realizing the negative effects of the deviation. Further, because the user's account balance is not reduced with soft planning, the real-world impact is not properly communicated to the user. A potential technique to reduce a user's account balance without tokens is to create multiple accounts. However, multiple accounts can have significant drawbacks, including managing access, minimum balance requirements, increased complexity, among others.

Implementations that leverage token conversions and simulations for the user's account can provide a realistic user experience that is more likely to result in an achieved goal. Because token conversions reduce the user's account balance while showing a token balance, there is an increased likelihood that the user/user account will meet the defined goal. In some implementations, a user can set one-time token conversions, reserving account resources—setting a particular note or use-case for the resources now represented as tokens. In some implementations, multiple sets of tokens in the same account can be reserved for different goals. In some cases, a token conversion schedule can be generated for a given goal. While the user is able to deviate from the token conversion schedule generated for the goal, the deviations may require intervention. In addition, deviations can change the token conversion schedule and modify the goal date, which presents the user with the practical cause and effect that will impact their goals. Some implementations also leverage forecasting by trained machine learning components to generate and/or modify token conversion schedules. Such forecasting provides an improved simulation of the user's account and enhances the likelihood of reaching the goal status.

Moreover, the arrangement of computing systems and data structures described herein overcome the limitations of conventional systems. For example, implementations that leverage trained machine learning models convert big data stored in large databases to actionable trends stored in the trained models. Inferences from these trained models can forecast a user's account with enhanced accuracy based on the trends present in the training data without any need to communicate with the large database. In other words, the trained machine learning models efficiently power account simulation using big data trends without the computing and overhead associated with accessing, querying, and analyzing large databases.

Further, various regulations can restrict how resources in an account can be limited for draws on that account. Thus, it may be impossible to segment an account for specific purposes. While this can be overcome by establishing separate accounts, one for each purpose, this imposes significant management and computing system utilization needs on both the institution managing the account and the account owner. The arrangement of computing systems and data structures described herein reduce the computing power and data storage requirements for managing such accounts by converting account resources to sets of tokens that can be allocated, within the account, to particular purposes. Thus, for example, the system managing these accounts can simply maintain a small set of variables for each token set within the account, as opposed to having to maintain an entire new account for each goal. This also reduces the computing resources needed to administer such accounts, such as complying with the accounting and ledger maintenance regulations required for each additional account.

Simulations and/or account management in some implementations are performed by automated agents that interface with account systems to provide automated control of data structures that manage the user's account. For example, conversion of account balance to tokens (and tokens to account balance) can be managed by a data structure, and one or more automated agents can perform updates to the data structure. In another example, a data structure can define conversions for token conversion schedules, and one or more automated agents can traverse these data structure to perform conversions according the schedules and/or update these data structures to define the token conversion schedules. In another example, automated agents can be used to generate token conversion schedules and/or modifications to token conversion schedules, which can then be used to update the data structure that manages these schedules. These automated agents, in combination, interface with accounts systems to enhance the user's experience and enable greater degrees of automatic account management.

Several implementations are discussed below in more detail in reference to the figures. FIG. 1 is a block diagram illustrating an overview of devices on which some implementations of the disclosed technology can operate. The devices can comprise hardware components of a device 100 that implement simulations that simulate conditions while progressing towards a goal state using token conversions. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, account simulator 164, and other application programs 166. Memory 150 can also include data memory 170, e.g., users, users' accounts, goals, historic data about users' accounts, training data, rules, algorithms, trained machine learning models, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
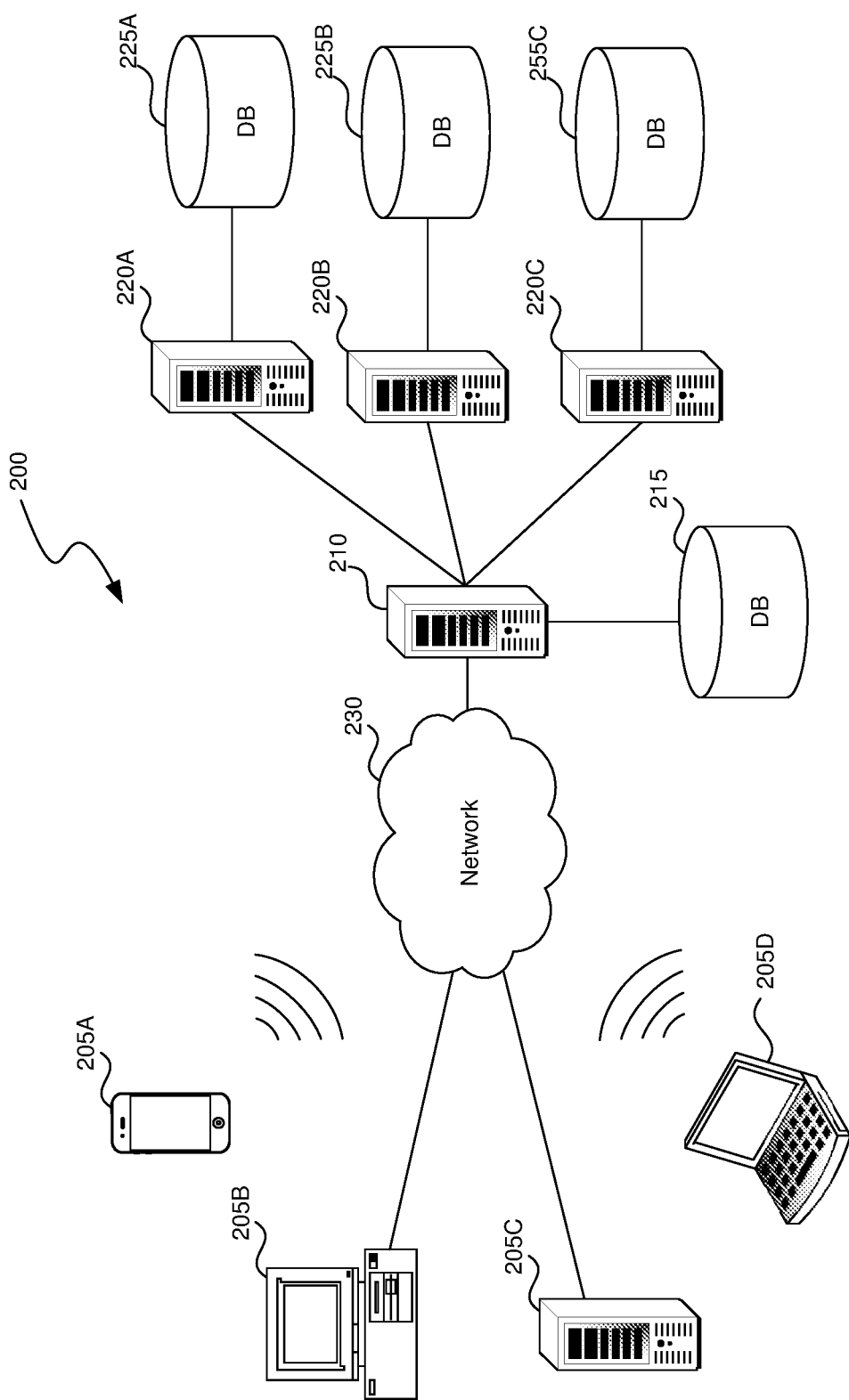
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as test results, monitored state data, historic monitored state data, rules, thresholds, and the like. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
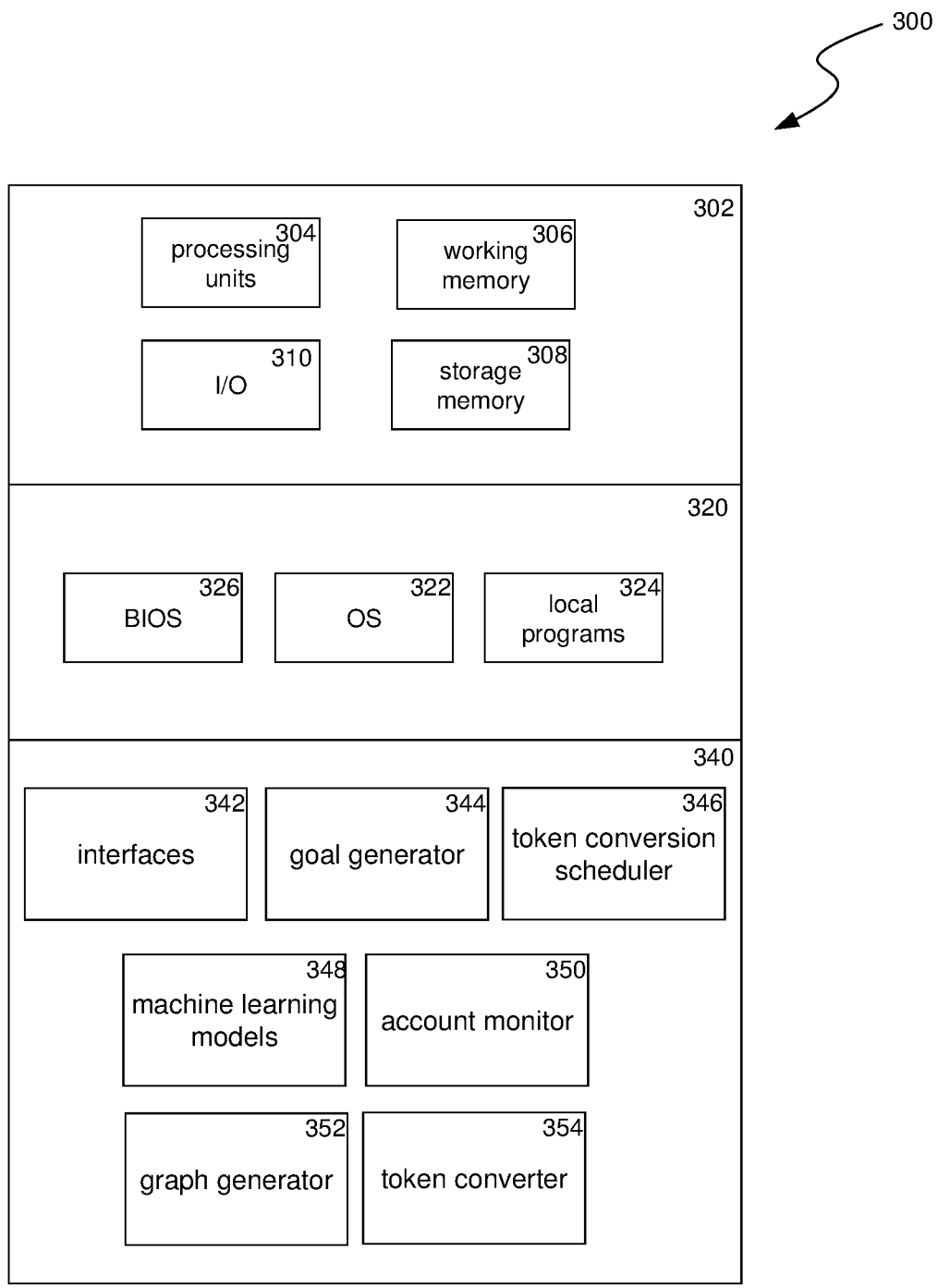
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g., CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include goal generator 344, token conversion scheduler 346, machine learning models 348, account monitor 350, graph generator 352, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Goal generator 344 can generate goals, such as products, services, investments, and other suitable goals that correspond to a number of tokens. For example, goal generator 344 can receive a goal from a user, such as a defined number of tokens and a goal identifier or label. In another example, one or more goals and can be presented to a user (e.g., with a corresponding number of tokens) and a user selection can be received by goal generator 344. In some implementations, a goal date or goal criteria (e.g., window of time) can be received for a defined or selected goal. Goal generator 344 can define goals and trigger token conversion scheduler 346 to generate a schedule for achieving the goal.

Token conversion scheduler 346 can generate a token conversion schedule for a given goal. The token conversion schedule can define multiple instances of token conversions (e.g., converting account balance to tokens), such as weekly conversions, and a goal date. In some implementations, deviations from the token conversion schedule can be observed, for example based on user activity that manually converts tokens back to account balance, skips a scheduled token conversion, or modifies a scheduled token conversion. Token conversion scheduler 346 can also modify an existing token conversion schedule based on observed deviations. For example, the modifications can include changes to the multiple instances of token conversions, changes to the goal date, and other suitable modifications. In some implementations, token conversion scheduler 346 generates or modifies token conversion schedules to enhance the likelihood of reaching the defined goals. For example, token conversion scheduler 346 can leverage machine learning models 348 to generate or modify token conversion schedules.

Machine learning models 348 can be any machine learning model suitable for forecasting a token conversion schedule using features from one or more of: the goal, the user, the user's account, deviations from an existing token conversion schedule, the calendar, and other suitable information. In some implementations, machine learning models 348 can be configured or trained using historic data that includes features from users, users' accounts, token conversion schedules, deviations, whether the goal was achieved, whether the goal was achieved by the goal date, user satisfaction, and other suitable historic data. Machine learning models 348 can be supervised learning models, unsupervised learning models, or other models that can learn from the historic data.

In some implementations, machine learning models 348 can be used to provide goal generator 344 with suitable goals for a user and/or user account. For example, based on user features and user account features, a machine learning model can be configured to predict goals that enhance user satisfaction and a probability of success for achieving the goal. The goals predicted by machine learning models 348 be provided to goal generator 344 and presented to a user for selection.

Account monitor 350 can monitor user accounts in comparison to generated token conversion schedules. For example, account monitor 350 can confirm compliance with token conversion schedules and/or identify deviations from token conversion schedules. In some implementations, account monitor 350 may analyze a period time (e.g., a week) and compare a user account's status at the end of the period of time to an expected status based on a token conversion schedule. For example, an expected number of converted tokens can be compared to an actual number of converted tokens at the end of a given week. This can permit user activity that alters token conversions within the week, as ultimately a user account will be found to comply with a token conversion schedule if the conclusion of the week meets an expected status.

In some implementations, account monitor 350 tracks token balance(s) in an account. For example, a variety of tokens can be in a given account and can be allocated to different purposes. Account monitor 350 can monitor the token balance(s) for these tokens such that the user can be readily informed of the account status. For example, when a user checks their account, they can view an account balance, token balance(s), and a breakdown of the allocations of token sets for defined goals. The account monitor 350 can provide this information.

Graph generator 352 can generate graphs for display to a user to visualize a token conversion schedule. For example, a graph can be generated that visually displays expected token conversions over a period of time from current day to a goal date. In some implementations, modifications to a token conversion schedule can be presented to a user for confirmation. In such an example, graph generator 352 may generate side to side graphs that depict the original token conversion schedule and the modified token conversion schedule such that the user can understand the changes that the modifications present prior to confirming the modification.

Token converter 354 can implement conversions from account balance to tokens and/or from tokens to account balance. For example, token converter 354 can manage a data structure that holds information about account balances and token balances for tokens active for an account. In some implementations, conversions can include a one-to-one modification for the two elements of the transaction. For example, converting X amount of account balance to a given token can involve subtracting X from the account balance total and adding X to the given token balance. In another example, various scaling factors can be implemented when the conversion is not one-to-one.

Token converter 354 can perform token conversions according to token conversion schedule(s) active for an account. For example, scheduled token conversions can be executed to update the data structure that manages the account and token balances. Token converter 354 can also respond to a user-initiated conversion of token to account balance or account balance to token. For example, the user may initiate a one-time conversion, and the one-time conversion can be executed to update the data structure that manages the account and token balances. In another example, token converter 354 can convert tokens to account balance based on a rule set. For example, where a rule defines a minimum account balance, a triggering of the rule can cause token converter 354 to automatically execute a tokens to account balance conversion that updates the data structure that manages the account and token balances.

Figure 4:
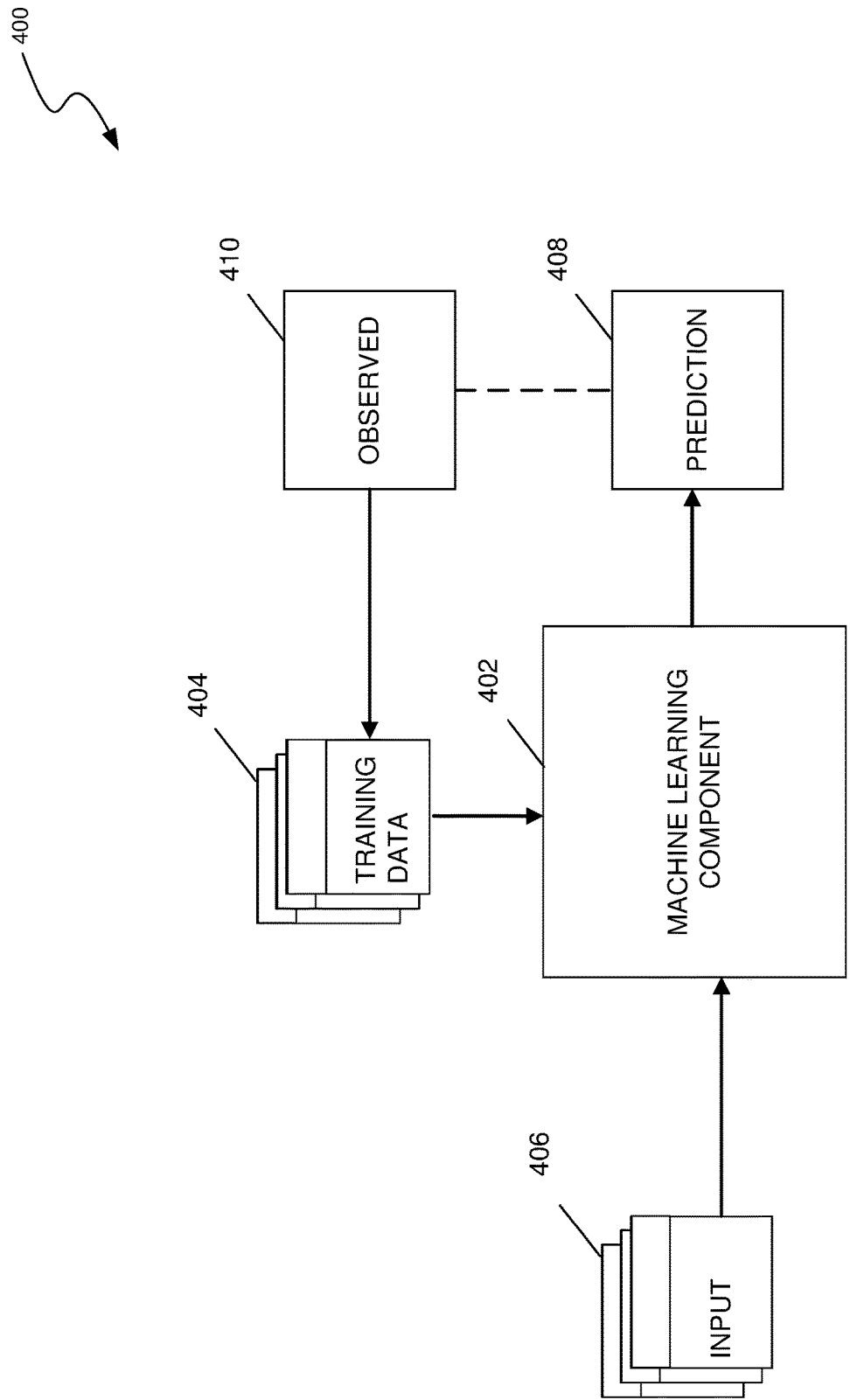
FIG. 4 is a system diagram illustrating components of a machine learning system.

FIG. 4 is a system diagram illustrating components of a machine learning system. System 400 includes machine learning component 402, training data 404, input data 406, prediction 408, and observed data 410. Machine learning component 402 can be a designed model that includes one or more machine learning elements (e.g., a neural network, support vector machine, Bayesian network, random forest classifier, gradient boosting classifier, and the like). Training data 404 can be any set of data capable of training machine learning component 402 (e.g., a set of features with corresponding labels, such as labeled data for supervised learning). Training data 304 can be used to train machine learning component 302 to generate a trained machine learning model.

Machine learning component 402 of FIG. 4 can be implemented by account simulator 164 of FIG. 1 and/or machine learning models 348 of FIG. 3. For example, a trained machine learning model may be configured to forecast a token conversion schedule and/or a modified token conversion schedule. In an example, training data 404 can include instances of historic data including: users' actions, users' accounts, goals, token conversion schedules, deviations, outcomes, and other suitable information. Accordingly, prediction 408 generated by machine learning component 402 trained by versions of training data 404 can be forecasted token conversion schedules generated to enhance a likelihood of success. In another example, machine learning component 402 can be trained by trained data 404 to predict goals for particular users and/or users' accounts. In this example, a user can be presented with one or more goals predicted by machine learning component 402 to be of interest to the user.

In some implementations, results for the predictions can be observed. For example, upon generating a token conversion schedule (e.g., for a particular combination of goal, user, and user account) deviations from the schedule and/or outcomes for the goals can be observed. The feedback can be retrieved (e.g., represented in FIG. 4 as observed data 410), and this feedback can be processed to update training data 404. For example, training data 404 can be updated to include new instances of training data, new labels (e.g., successful token conversion schedules, user satisfaction labels, and other), and other updates. This updated training data 404 can be used to re-train, update the training of, and/or train a new version of machine learning component 402.

The design of machine learning component 402 can include any suitable machine learning model components (e.g., a neural network, support vector machine, specialized regression model, random forest classifier, gradient boosting classifier, and the like). For example, a neural network can be implemented along with a given cost function (e.g., for training/gradient calculation). The neural network can include any number of hidden layers (e.g., 0, 1, 2, 3, or many more), and can include feed forward neural networks, recurrent neural networks, convolution neural networks, modular neural networks, and any other suitable type. In some implementations, the neural network can be configured for deep learning, for example based on the number of hidden layers implemented. In some examples, a Bayesian network can be similarly implemented, or other types of supervised learning models.

For example, a support vector machine can be implemented, in some instances along with one or more kernels (e.g., gaussian kernel, linear kernel, and the like). In some implementations, a k-nearest neighbor ("KNN") algorithm can be implemented. For example, a KNN algorithm can determine a distance between input features (e.g., features for a specific combination of a user, user account, and goal, represented by input 406) and historic training data instances. One or more "nearest neighbors" relative to this distance can be determined (the number of neighbors can be based on a value selected for K). In some implementations, the determined nearest neighbors can have features similar to the input features and positive outcomes (e.g., instances of training data that successfully reached the goal with few or no deviations). Prediction 408 can then be generated based on the distances from these "nearest neighbor" instances. For example, a forecast token conversion schedule can share similarities with token conversion schedules for the nearest neighbors and/or predicted goals can be similar to the goals for the nearest neighbors.

In some implementations, machine learning component 402 can include an ensemble learning model. For example, machine learning component 402 can include a random forest classifier that includes multiple machine learning components whose predictions are combined. Implementations of the random forest classifier include decision trees that are trained by training data 404 (e.g., using subsets of the training data per tree). The random forest algorithm can then aggregate votes from these decision trees to arrive at a prediction.

In some implementations, machine learning model 402 can include a gradient boosting learning algorithm, such as XGBoost. The gradient boosting algorithm can similarly leverage an ensemble learning technique with multiple decision trees trained using training data 404, however the gradient boosting algorithm can align decision trees in sequence. In this implementation, a tree later in the sequence learns to "correct" errors from predictions generated by earlier decision trees. The gradient boosting learning algorithm aggregates predictions generated by the individual decision trees to generate prediction 408. Individual decision trees can be trained using a recursive splitting algorithm that splits nodes of the tree (e.g., recursive binary splitting), or any other suitable training technique.

Machine learning component 402 can be multiple models stacked, for example with the output of a first model feeding into the input of a second model. Some implementations can include a number of layers of prediction models. Features utilized by machine learning component 402 can also be determined. For example, feature engineering can be used to generate a set of features implemented by one or more machine learning models.

In some implementations, the design of machine learning component 402 can be tuned during training, retraining, and/or updated training. For example, tuning can include adjusting a number of hidden layers in a neural network, adjusting a kernel calculation used to implement a support vector machine, and the like. This tuning can also include adjusting/selecting features used by the machine learning model. Various tuning configurations (e.g., different versions of the machine learning model and features) can be implemented while training in order to arrive at a configuration for machine learning component 402 that, when trained, achieves desired performance (e.g., performs predictions at a desired level of accuracy, run according to desired resource utilization/time metrics, and the like). Retraining and updating the training of machine learning component 402 can include training the model with updated training data. For example, the training data can be updated to incorporate observed data, or data that has otherwise been labeled (e.g., for use with supervised learning).

In some implementations, machine learning component 402 can include an unsupervised learning component. For example, one or more clustering algorithms, such as hierarchical clustering, k-means clustering, and the like, or unsupervised neural networks, such as an unsupervised autoencoder, can be implemented. For example, historic data that includes instances of users, users' accounts, goals, token conversion schedules, and outcomes can be input to the unsupervised learning component to learn aspects of the data, such as clusters that relate features to positive outcomes. Based on the learned relationships, predictions 408 can include forecast token conversion schedules and/or predicted goals associated with positive outcomes.

Implementations generate simulations of a user's account (e.g., bank account) such that a goal number of tokens is achieved by a goal date. Goal tokens, or credit towards the goal, can enable the user to segregate their account for financial planning. In some implementations, a token is worth one dollar in account balance. Because token conversions reduce the user's bank account, there is an increased likelihood that the user/user account will meet the defined goal. While the user is able to deviate from the token conversion schedule generated for the goal, the deviations require intervention (e.g., manual token conversions or token conversions that occur as a result of established conversion triggers). For example, a user can establish a rule that tokens should be converted to account balance when the account balance goes below a designated minimum threshold. In some implementations, sets of tokens in an account are assigned to different groups (e.g., each corresponding to a user's goal or specified use) and the user can define a hierarchy for an order of which token group conversion triggers should come from. In some cases, the hierarchy can further define rules such as only converting from a token group if the group has at least a specified amount of tokens. In addition, deviations can change the token conversion schedule and modify (e.g., push out) the goal date, which presents the user with the practical cause an effect that will impact their goals.

When soft account planning (e.g., without token conversions) is used, a user can readily deviate from the plan without realizing the negative effects of the deviation. Further, because the user's account balance is not reduced with soft planning, the real-world impact is not properly communicated to the user. Further, various regulations can restrict how monitory resources in an account can be limited for draws on that account. Thus, it may be impossible to segment funds in an account for specific purposes. While this can be overcome by establishing separate accounts, one for each purpose, this imposes significant management and computing system utilization needs on both the institution managing the account and the account owner. Implementations that leverage token conversions and simulations for the user's account can provide a realistic user experience that is more likely to result in an achieved goal while also reducing the computing system load imposed by maintaining multiple accounts for different purposes.

In some implementations, a token conversion schedule can automatically distribute account funds according to the token conversion schedule. For example, an account may have an account balance (e.g., dollar amount) and the account may experience funding (e.g., increases to the account balance) and debits (e.g., decreases to the account balance). In some implementations, a funding event can be cyclic, such as a paycheck that arrives monthly, weekly, bi-weekly, and the like.

In some implementations, the token conversion schedule can be configured to align with a funding event for the user's account. For example, when an expected amount of funds is deposited into the user's account (e.g., an expected paycheck provided to the account through direct deposit) a portion of the funds may be converted to tokens as defined in the token conversion schedule. In this example, the funds are quickly converted to tokens so they do not appear (or only appeared briefly) as account balance. In other words, the quick token conversion can make the entire transaction appear like a distribution to different sources rather than a "loss" from the bank account. This can improve the user's self-described goal, as the token conversions are less likely to be viewed by the user as a loss.

In some implementations, the token conversion schedule can be configured to convert a defined amount of account balance to tokens at repeated intervals (e.g., on a weekly basis). For example, where a goal date is eight weeks away and a goal number of tokens is 2000, the token conversion schedule can define that: at the end of each of the eight weeks $250 is converted to 250 tokens. In other words, the token conversions can be spread out evenly across the eight weeks. In another example, where a goal number of tokens is 2000, a goal date is eight weeks away, and weeks one and five contain expected funding events (e.g., weeks one and five include paycheck days), the token conversion schedule can define that: at the end of weeks two, three, four, six, seven, and eight $200 is converted to 200 tokens and at the end of weeks one and five $400 is converted to 400 tokens. In other words, the token conversions can be spread out unevenly across the eight weeks (e.g., to optimize fit with the user's account activity).

In some implementations, a user can perform their own token conversions (e.g., without a conversion schedule). For example, a user can input an amount of account balance to convert to tokens and/or an amount of tokens to convert to account balance. In this example, the user can implement their own token conversions towards a goal or to implement their own financial planning.

In some implementations, several sets of tokens may be active for a given account. In this example, the user may select which of the several sets of tokens will take part in a conversion. For example, where token sets A, B, and C are active, the user may initiate a conversion of token C to account balance (e.g., reduce the balance of token C and increase the account balance). In another example, the user can convert account balance to tokens, and select token B for the conversions.

Account balance, token set balance, and conversions can be managed by a data structure. Below is an example data structure:

| Account Balance | Token A | Token B | Token C |
|---|---|---|---|
| 10,000 | 500 | 700 | 900 |

In some implementations, conversions can have a source and a destination, and conversions can be executed by subtracting from the source and adding to the destination. For example, converting X amount of account balance to a given token can involve subtracting X from the account balance total and adding X to the given token balance. In another example, converting X amount of Token A to Token C can involve subtracting X from Token A's balance and adding X to Token B's balance. The data structure an also include a data field that indicates the goal for each token set.

In some implementations, conversions can include a one-to-one modification for the two elements of the transaction. In another example, various scaling factors can be implemented when the conversion is not one-to-one. In some implementations, when a user activates a new goal/token set, the data structure can add a new column for the new token set. Conversions can then be executed for the new token set to manage the new token's balance. The data structure can provide up-to-date status information that reflects account balance and token balance.

In some implementations, an integrity check can be defined to ensure the data structure maintains balances without error. For example, a separately managed account balance may store the overall account balance without modification by the tokens (e.g., account balance as though no tokens were active). The integrity check may sum the account balance and token balance(s) in the data structure (and/or implement scaling if a token does not have a one-to-one conversion), and compare the sum to the separately managed account balance. This can ensure that all of the user's account funds are properly reflected by the account balance and token balance(s).

In some implementations, a user can establish a rule that tokens should be converted to account balance when the account balance goes below a designated minimum threshold. In some implementations, sets of tokens in an account are assigned to different groups (e.g., each corresponding to a user's goal or specified use) and the user can define a hierarchy for an order of which token group conversion triggers should come from. In some cases, the hierarchy can further define rules such as only converting from a token group if the group has at least a specified amount of tokens.

In some implementations, a data structure can also manage expected allocations from token conversion schedule(s). Consider an example of a regular weekly conversion of $500 from account balance to Token A and $250 from Account Balance to Token B, the data structure can store this information:

| Source | Destination | Amount | Frequency |
|---|---|---|---|
| Account Balance | Token A | 500 | weekly |

| Source | Destination | Amount | Frequency |
|---|---|---|---|
| Account Balance | Token B | 250 | weekly |

In some implementations, performing token conversions according to token conversion schedule(s) can involve iteratively progressing through this data structure and implementing the conversions defined according to the defined frequency in the specified amounts. When viewing the account, a user can view the account balance, token balances, and expected allocations (provided by the above data structure). In some implementations, not all active tokens include a token conversion schedule. For example, some active tokens acquire token balance through one-time conversions initiated by the user. In some implementations, the data structure that manages the account balance, token set balance, and conversions and the data structure that manages the expected allocations from token conversion schedule(s) can be a single data structure.

Figure 5:
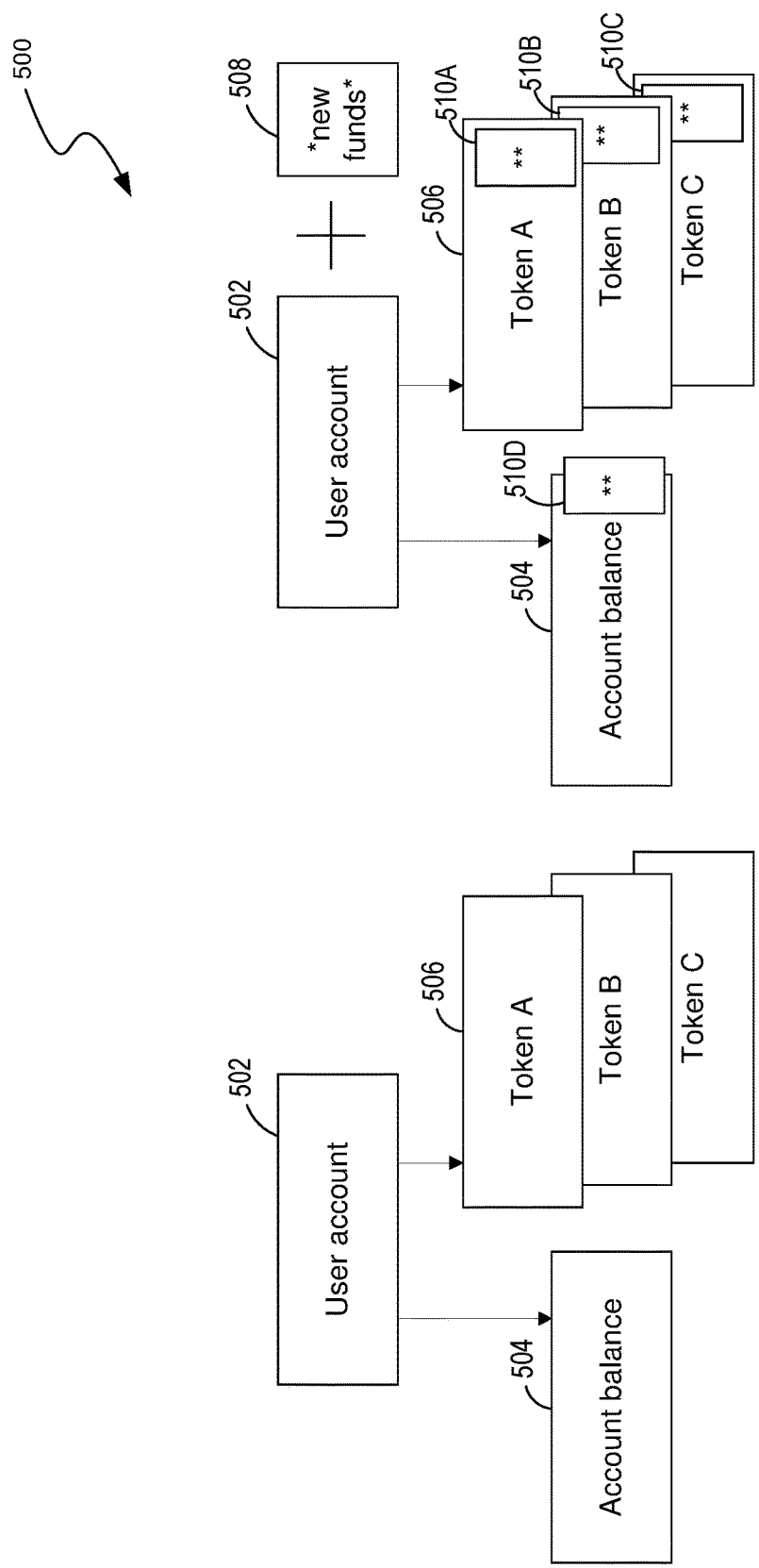
FIG. 5 is a conceptual diagram illustrating token conversions according to token conversion schedules.

In some implementations, a user account can have multiple goals defined, multiple goal specific token sets, and multiple token conversion schedules. FIG. 5 is a conceptual diagram illustrating token conversions according to token conversion schedules. Diagram 500 includes user account 502, account balance 504, and goal specific tokens 506. In the illustrated example, three goals (e.g., goal A, B, and C) and three goal specific tokens are active for the user's account. Goal specific tokens 506 have been converted from account balance 504.

Diagram 500 illustrates that new funds 508 are deposited into user account 502. In some examples, token conversion schedules for goals A, B, and C can define that portions of account balance 504 are automatically converted to tokens A, B, and C (e.g., in amounts according to each token conversion schedule) when new funds 508 are deposited. In another example, new funds 508 can be deposited to user account 502 and reflected as account balance 504, and at a defined time (e.g., defined in each token conversion schedule) defined amounts of account balance 504 can be converted to tokens A, B, and C. Diagram 500 illustrates that new funds 508 are reflected as portions 510A-D within each of account balance 504 and goal specific tokens 506. In other words, new funds 508 can end up being distributed across account balance 504 and goal specific tokens 506 after scheduled balance to token conversions.

Implementations of an account simulator can generate token conversion schedules based on the specific circumstances presented, such as the specific user, user account, goal, and other suitable information. For example, a user's account history can be analyzed to determine whether sufficient account balance will be available to achieve a goal number of tokens by a goal date. An algorithm or machine learning model can be configured to predict a probability of success for specific combinations of users, user accounts, goals, calendar, and other suitable information. User features can include number of accounts, total balance across accounts, known debts, marriage status, investment accounts, credit score, and other suitable user features. User account features can include current balance, history of balance, timings and amounts for funding transactions, timing and amounts for debit transactions, joint or individual accounts status, and other suitable account features. Goal features can include a goal type (e.g., specific product, specific service, specific investment, etc.), total number of tokens, and other suitable goal features. Calendar features can include time of year and other suitable calendar features.

Historic data can be used to forecast a token conversion schedule that is specific to a user's circumstances (e.g., input features such as user action features, user account features, goal features, calendar features). For example, a machine learning model can be trained (e.g., using training data derived from this historic data) to forecast a token conversion schedule based on input that includes a combination of user action features, user account features, goal features, calendar features, and other suitable features. The training data can include features from historic data that are similar to the input features along with historic token conversion schedules and labeled outcomes (e.g., indications about whether the goal was reached, user satisfaction indications, and other outcome labels). Trends that correlate input features to positive outcomes can be discovered by the machine learning models. These trends can then be used to forecast a token conversion schedule with a likelihood of success.

For example, the machine learning model can output a goal date (e.g., a calendar date or a duration of time in weeks) and multiple instances of token conversions (e.g., weekly). In some implementations, the machine learning model (or a separate machine learning model) can be trained to predict an account balance for the user's account for a given token conversion schedule. Implementations of the machine learning model can be configured to generate multiple candidate token conversion schedules, and one or more rules can be defined to select among the candidates. For example, a minimum account balance can be defined, and a token conversion schedule that complies with the minimum account balance can be selected. In another example, a token conversion schedule with the earliest goal date that also complies with the minimum account balance can be selected. Implementations can include other suitable techniques for generating a token conversion schedule (or multiple token conversion schedules) for a specific combination of user circumstances (e.g., input features).

In some implementations, a machine learning model can be trained to forecast modifications to an existing token conversion schedule. For example, a machine learning model can be trained (e.g., using training data derived from historic data) to forecast a token conversion schedule based on input features (e.g., a combination of user features, user account features, goal features, calendar features, and other suitable features), the existing token conversion schedule, and observed deviations from the existing token conversion schedule. The training data can include features from historic data that are similar to the input features along with historic token conversion schedules, deviations, and labeled outcomes (e.g., indications about whether the goal was reached, user satisfaction indications, and other outcome labels). Trends that correlate input features, existing token conversion schedules, and deviations to positive outcomes can be discovered by the machine learning models. These trends can then be used to forecast a modified token conversion schedule with a likelihood of success.

For example, the machine learning model can output a modified goal date (e.g., a calendar date or a duration of time in weeks) and multiple instances of modified token conversions (e.g., weekly). Implementations of the machine learning model can be configured to generate multiple candidate modified token conversion schedules, and one or more rules can be defined to select among the candidates. For example, a minimum account balance can be defined, and a modified token conversion schedule that complies with the minimum account balance can be selected. In another example, a modified token conversion schedule with the earliest goal date that also complies with the minimum account balance can be selected. Implementations can include other suitable techniques for modifying a token conversion schedule (or multiple token conversion schedules) for a specific combination of user circumstances (e.g., input features), an existing token conversion schedule, and observed deviations from the existing token conversion schedule.

In some implementations, a token conversion schedule can be generated as a simple reoccurring conversion of account balance to tokens until a goal date is achieved. For example, a user can select a goal with a goal number of tokens and a goal date (or provide a goal with a goal number of tokens and a goal date), and the token conversion schedule can evenly divide token conversions sufficient to reach the goal number among the weeks between the current date and the goal date.

Figure 6:
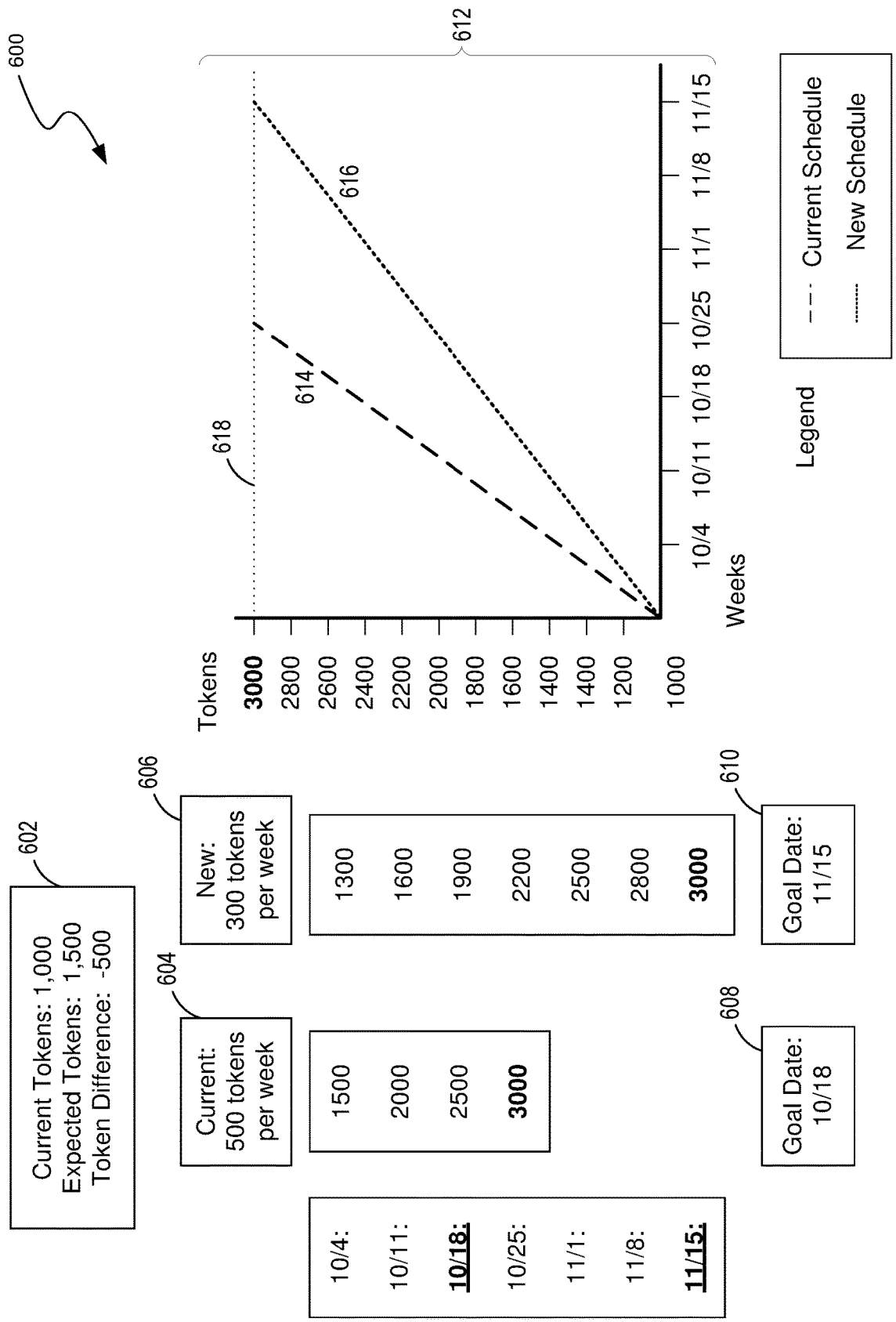
FIG. 6 is a conceptual diagram illustrating dynamic simulations and token conversions based on observed user activity.

In some implementations, user-initiated conversions of goal specific tokens back to account balance can cause deviations from a token conversion schedule. FIG. 6 is a conceptual diagram illustrating dynamic simulations and token conversions based on observed user activity. Diagram 600 includes token status 602, current token conversion schedule 604, modified token conversion schedule 606, current goal date 608, modified goal date 610, graph 612, current graph schedule 614, modified graph schedule 616, and token goal 618. Diagram 600 can be a user interface displayed to a user that visually depicts the illustrated elements.

In the illustrated example, a goal has been defined/selected and current token conversion schedule 604 has been generated for the goal (e.g., by implementations of account simulators). Further, the user has initiated one or more deviations from current token conversion schedule 604. As illustrated by token status 602, the current token amount, 1,000, is 500 less than the expected token amount, 1,500. This may be because the user initiated one or more conversions from token to account balance in the past.

In some implementations, account simulators can generate modified token conversion schedule 606. For example, where current token conversion schedule 604 converts 500 tokens per week, modified token conversion schedule 606 converts 300 tokens per week. This slowed pace may be more practical for the user/user account. Under current token conversion schedule 604, current goal date 608 of October 18th will be missed because the current token total is less than the expected token total. Under modified token conversion schedule 606, new goal date 610 can be extended to November 15th, which may be more realistic for the user and may still meet a user goal criteria (e.g., goal by the holidays).

Graph 612 can graphically depict the current token conversion schedule (current graph schedule 614) and the modified token conversion schedule (modified graph schedule 616) over time. The graph can also visually depict token goal 618 to provide perspective for the two different graphed schedules. In some implementations, a user can be prompted to accept or confirm modified token conversion schedule 606, and a user interface that displays the elements of diagram 600 can communicate the differences between current token conversion schedule 604 and modified token conversion schedule 606 to inform the user's decision.

Implementations of a user's account (e.g., bank account or other suitable account with a balance of funds) can perform token conversions to enable financial accounting that accurately reflects the user's account balance given the practical impact of saving towards a goal. The goal can be a product (e.g., a holiday purchase or present), a vacation package, a service (e.g., an entertainment experience), an investment goal, a use-case (e.g., house repair fund, emergency fund), or other suitable goal. Given the financial realities of saving towards the goal, the token conversions can provide the user an account's balance in a manner that is reflective of the goal's impact (without requiring separate accounts). For example, one or more simulators and a token conversion schedule can be used to simulate the account balance and token amounts over time. Because the success of saving towards a goal can be dependent on user circumstances, some implementations can tailor a token conversion schedule and/or modifications to the schedule to the user, account, goal, or a combination of these.

Figure 7:
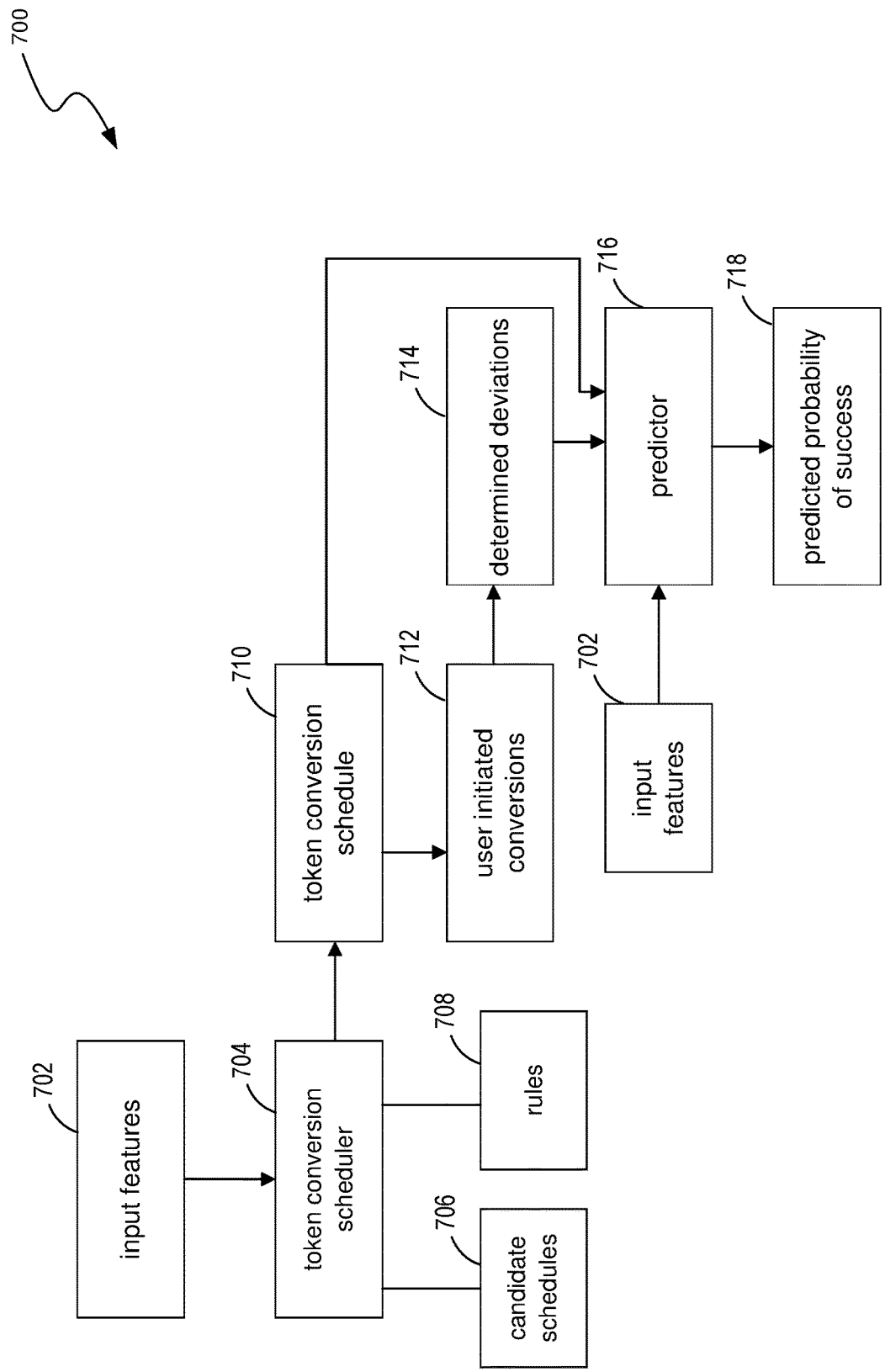
FIG. 7 is a block diagram illustrating components used in some implementations to dynamically simulate conditions until a goal state is reached using token conversions.

FIG. 7 is a block diagram illustrating components used in some implementations to dynamically simulate conditions until a goal state is reached using token conversions. In some implementations, the functionality of diagram 700 can be performed after a goal is defined. Diagram 700 includes input features 702, token conversion scheduler 704, candidate schedules 706, rules 708, token conversion schedule 710, user-initiated conversions 712, determined deviations 714, predictor 716, and predicted probability of success 718. Input features 702 can be user features, account features, goal features, calendar features, or a combination of these.

User features can include a number of accounts, total balance across accounts, known debts, marriage status, investment accounts, credit score, previous actions, expected expenditures, profession, age, investment strategy, and other suitable user features. User account features can include current balance, history of balance, timings and amounts for funding transactions, timing and amounts for debit transactions, joint or individual accounts status, and other suitable account features. Goal features can include a goal type (e.g., specific product, specific service, specific investment, etc.), total number of tokens, and other suitable goal features. Calendar features can include time of year and other suitable calendar features.

Token conversion scheduler 704 can receive input features 702 and generate token conversion schedule 710. In some implementations, token conversion schedule 710 is generated using candidate schedules 706 and rules 708. For example, token conversion scheduler 704 can generate several potential token conversion schedules (e.g., candidate schedules 706) and rules 708 can be used to select token conversion schedule 710 from among these. Candidate schedules 706 may differ in their goal dates, number of token conversions per week, regularity of token conversions, and other suitable aspects.

In some implementations, for a given token conversion schedule generated, token conversion scheduler 704 can predict a balance for the user's account over time based on the conversions defined in the given token conversion schedule. For example, funding and/or debit transactions can be predicted based on the user's account history. Using the current balance, these predicted transactions, and the expected balance that is converted to tokens over the given token conversion schedule, a prediction for the user's account balance over time can be generated.

Rules 708 can be one or more rules for selecting among candidate schedules 706 or a weight-based ranking. An example rule may be to select the candidate token conversion schedule with the earliest goal date that also meets a minimum predicted account balance over time. In another example, factors may be defined, such as goal date, predicted account balance (e.g., predicted account balance in excess of minimum account balance), and other suitable factors.

Candidate schedules 706 can be ranked according to the factors, such as a first candidate schedule with the earliest goal date and the third largest predicted balance, and a second candidate schedule with the third earliest goal date and the second largest predicted balance. A weight can be defined for each factor, such as the earliest goal date being assigned 5, second earliest goal date being assigned 4, and so on. In another example, the largest predicted balance can be assigned 5, second largest predicted balance can be assigned 4, and so on. The sum the weight factors can be the score for each of candidate schedules 706, and the largest score can be selected as token conversion schedule 710. In the above example, the first candidate schedule would be assigned a score of 8 (e.g., 5+3) and the second candidate scheduled would be assigned a score of 7 (e.g., 4+3). Accordingly, the first candidate schedule would be selected as token conversion schedule 710.

In an example, token conversion scheduler 704 can be a machine learning model (e.g., trained machine learning model, unsupervised machine learning model, etc.). In another example, token conversion scheduler 704 can be a combination of a rule-based engine and one or more algorithms designed to generate token conversion schedules. Token conversion scheduler 704 can generate token conversion schedule 710 (and candidate schedules 706) in any other suitable manner.

User-initiated conversions 712 can be conversions generated by the user (e.g., tokens converted back to account balance) outside of token conversion schedule 710. For example, an unexpected expense may prompt a user to convert tokens back to account balance to fund the user's account for the unexpected expense. Some implementations may include several user-initiated conversions 712.

In some implementations, several sets of tokens may be active for a given account. In this example, the user may select which of the several sets of tokens will take part in a conversion. For example, where token sets A, B, and C are active, the user may initiate a conversion of token C to account balance (e.g., reduce the balance of token C and increase the account balance). In another example, the user can convert account balance to tokens, and select token B for the conversions.

Determined deviations 714 can be deviations from token conversion schedule 710 caused by user-initiated conversions 712. For example, deviations may be determined by comparing an expected token amount to an observed token amount at a particular time (e.g., at a defined end of a week). This can permit user activity that alters token conversions within the week, as ultimately no deviation will be found if at the conclusion of the week an expected token amount is observed.

Predictor 716 can receive the determined deviations, input features 702, and token conversion schedule 710, and generate predicted probability of success 718. For example, predictor 716 can be a machine learning model trained using historic data that includes token conversion schedules for goals, observed history for user accounts with a defined token conversion schedule, observed deviations, observed modifications, and observed outcomes (e.g., whether the goal was successfully achieved in a permitted time frame, user satisfaction, etc.). Based on trends in the historic data, predictor 716 can generate predicted probability of success 718 for input that includes input features (e.g., input representing the status of the user, account, goal, calendar), token conversion schedule 710, and determined deviations 714 (e.g., input that represents how well the user account complies with token conversion schedule 710). Predictor 716 can generate predicted probability of success 718 in any other suitable manner.

In some implementations, when predicted probability of success 718 is below a threshold, a modification to token conversion schedule 710 can be generated. In another example, when one or more determined deviations 714 are detected, a modification to token conversion schedule 710 can be generated.

Figure 8:
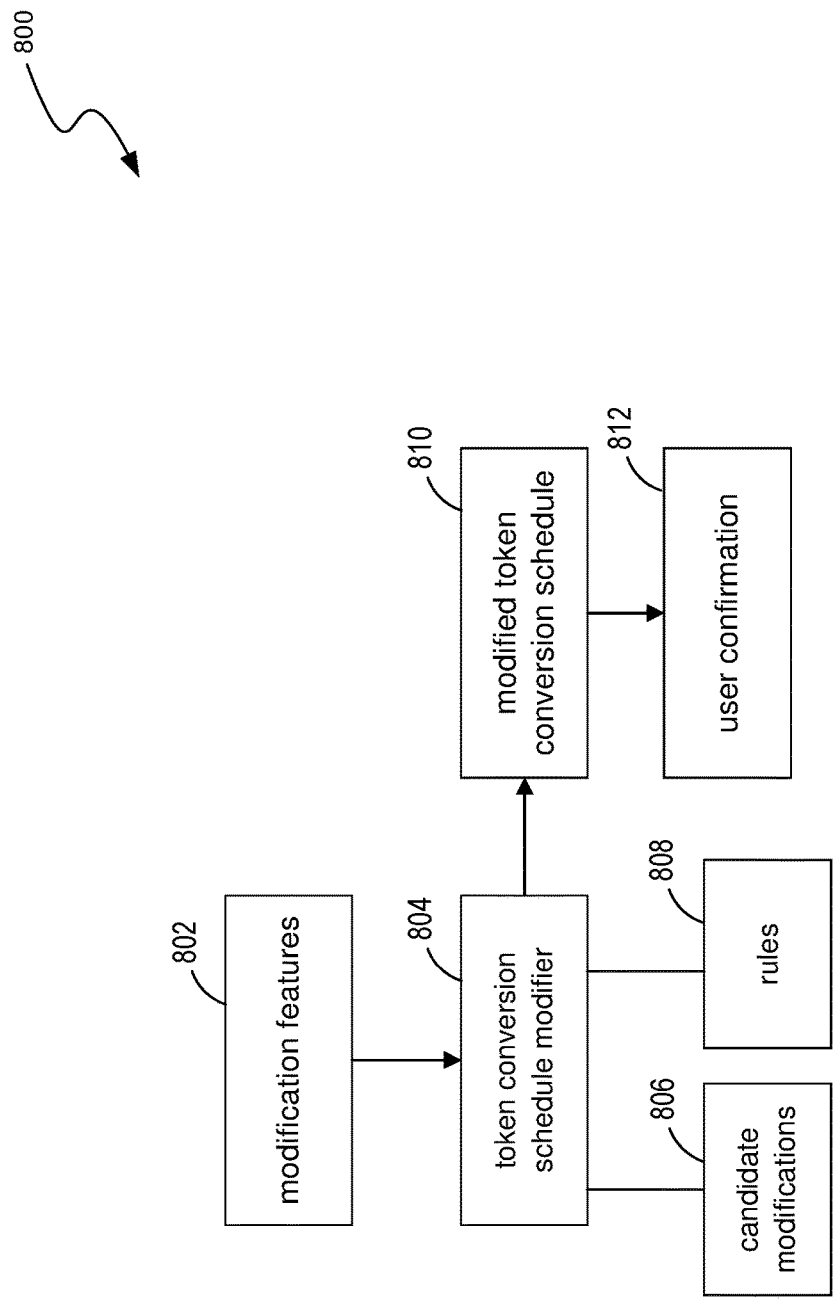
FIG. 8 is a block diagram illustrating components used in some implementations to dynamically simulate modified conditions until a goal state is reached using token conversions.

FIG. 8 is a block diagram illustrating components used in some implementations to dynamically simulate modified conditions until a goal state is reached using token conversions. In some implementations, the functionality of diagram 800 can be performed after a goal is defined, a token conversion schedule is generated, and deviations from the token conversion schedule are observed. Diagram 800 includes modification features 802, token conversion modifier 804, candidate modifications 806, rules 808, modified token conversion schedule 810, and user confirmation 812.

Modification features 802 can be similar to input features 702 of FIG. 7 (e.g., user features, account features, goal features, calendar features, or a combination of these) with the addition of token conversion schedule features, deviation features, and other features that represent how the user's account history compares to the token conversion schedule. For example, token conversion schedule features can include goal date, weekly conversions, and other suitable features. Deviation features can include a number of deviations, a timing for deviations, a difference in expected versus observed tokens and other suitable features.

Token conversion schedule modifier 804 can receive modification features 802 and generate modified token conversion schedule 810. In some implementations, modified token conversion schedule 810 is generated using candidate modifications 806 and rules 808. For example, token conversion schedule modifier 804 can generate several potential modified token conversion schedules (e.g., candidate modifications 806) and rules 808 can be used to select modified token conversion schedule 810 from among these. In some implementations, token conversion schedule modifier 804 can be configured to generate candidate modifications 806 and select among them using rules 808 to generate modified token conversion schedule 810 in a manner similar to token conversion scheduler 704 of FIG. 7.

In an example, token conversion schedule modifier 804 can be a machine learning model (e.g., trained machine learning model, unsupervised machine learning model, etc.). In another example, token conversion schedule modifier 804 can be a combination of a rule-based engine and one or more algorithms designed to modify token conversion schedules. Token conversion schedule modifier 804 can generate modified token conversion schedule 810 (and candidate modifications 806) in any other suitable manner.

In some implementations, modified token conversion schedule 810 can be presented to a user and user confirmation 812 can be received to implement modified token conversion schedule 810. In another example, multiple of candidate modifications 806 (e.g., a top two or three) can be presented to the user and user confirmation 812 can be a selection of one of the presented candidates.

Those skilled in the art will appreciate that the components illustrated in FIGS. 1-8 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 9:
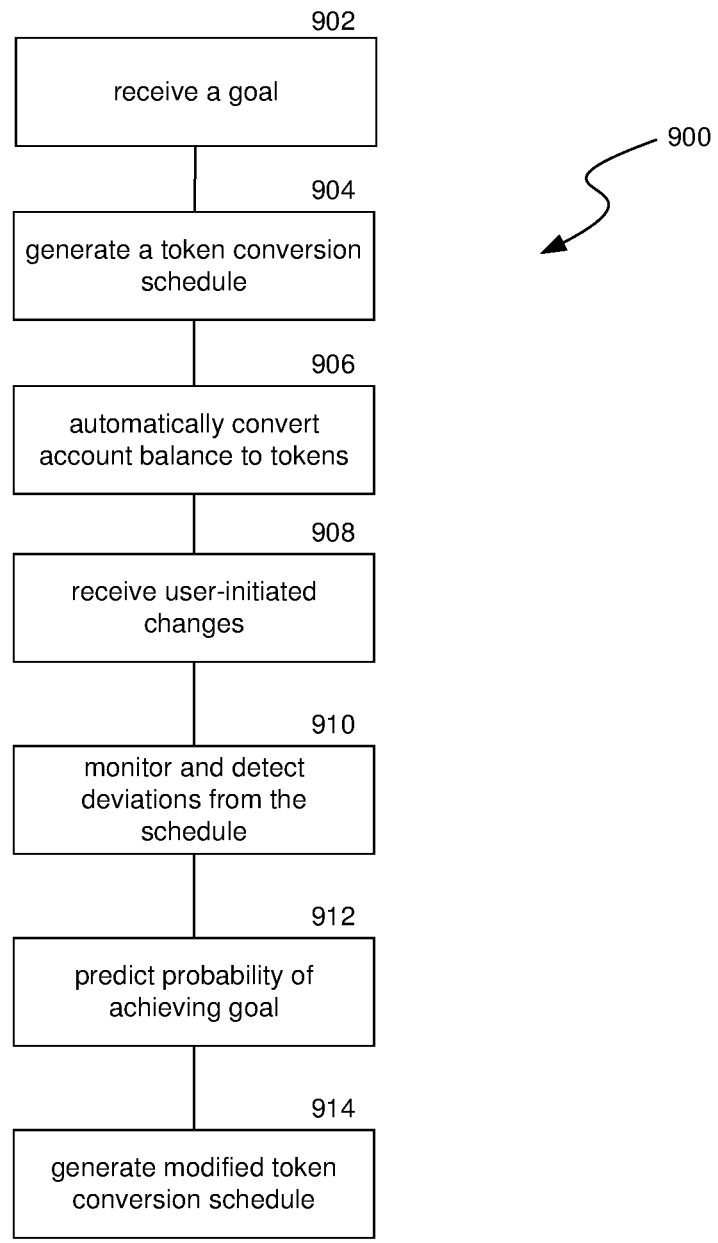
FIG. 9 is a flowchart illustrating a process used in some implementations for dynamically simulating conditions until a goal state is reached using token conversions.

FIG. 9 is a flowchart illustrating components used in some implementations for dynamically simulating conditions until a goal state is reached using token conversions. In some implementations, process 900 is performed for a goal in combination with a user account. Process 900 can be triggered based on an indication that a user account may incorporate a goal state simulation.

At block 902, process 900 can receive goal information comprising an amount and a goal date criteria. The received goal information can be a selection of goals presented to a user or a goal provided by the user without such a presentation. In some examples, the goal can have a goal type (e.g., product type, service type, investment type, and the like) and correspond to a number of tokens. In some implementations, a goal date criteria can be a goal date or a goal window (e.g., span of time for the goal date).

At block 904, process 900 can generate, based on the goal information, a token conversion schedule including a goal date and one or more instances of token conversions based on features of an account and features of a user. For example, the features of the account can be changes to the account balance over time and the features of the user can be, e.g., an aggregate account balance for the user across multiple accounts. The token conversion schedule can cover a period of time (e.g., current date to goal date) where conversions of account balance to tokens are scheduled (e.g., weekly) until the token amount for the goal is achieved. In some implementations, the token conversion schedule can be generated by a machine learning model using the features of the account and the features of the user.

At block 906, process 900 can automatically convert account balance to goal tokens over time according to the token conversion schedule. For example, the multiple instances of account balance to goal token conversions scheduled in the token conversion schedule can be automatically executed over time.

At block 908, process 900 can receive user-initiated changes that convert goal tokens to account balance or account balance to goal tokens. For example, user activity can convert back and forth between goal tokens to account balance and account balance to goal tokens at any desired time. At block 910, process 900 can monitor the user-initiated changes and detect deviations from the token conversion schedule based on the monitoring. For example, given the conversions scheduled in the token conversion schedule for a given time, an expected amount of goal tokens can be compared to an observed amount of goal tokens at the given time to detect deviations.

At block 912, process 900 can predict a probability of achieving the goal by the goal date based on the detected deviations. In some implementations, the probability can be predicted by a machine learning model trained and/or configured to receive input features (e.g., user features, account features, goal features, calendar features, existing token conversion schedule features, and deviation features) and generate a probability of a successful outcome for the current token conversion schedule (e.g., meeting the goal amount of tokens by the received goal date criteria). In an example, a modified token conversion schedule can be generated when the predicted probability is below a threshold.

At block 914, process 900 can generate a modified token conversion schedule that comprises a modification to the goal date based on the user-initiated changes. For example, the modified token conversion schedule can modify the multiple instances of goal token conversions within the original token conversion schedule and change the goal date. In some implementations, the modified token conversion schedule can be displayed as a graph that includes goal token amounts over time. For example, the modified token conversion schedule can be graphically displayed adjacent to the existing token conversion schedule, and a user can be prompted to confirm the modification.

The disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for simulating a goal state using token conversions, the method comprising:
   receiving goal information comprising an amount and a goal date criteria;
   generating, by an automated agent implemented by one or more computer, a token conversion schedule comprising a goal date and multiple instances of goal token conversions based on the goal information, features of an account, and features of a user, wherein the features of the account comprise at least changes to the account balance over time and the features of the user comprise at least an aggregate account balance for the user across multiple accounts;
   performing, by the automated agent, conversions of account balance to tokens by automatically performing updates to a data structure that manages, for the account, a number of tokens in the account;
   receiving user-initiated changes that convert goal tokens to account balance or account balance to goal tokens; and
   generating, by the automated agent using a trained machine learning model, a modified token conversion schedule that comprises a modification to the goal date based on the user-initiated changes, wherein the machine learning model is trained using historical data representative of: a) past token conversion schedules, and b) outcomes for the past token conversion schedules, and the modified token conversion schedule is displayed as a graph comprising goal token amounts over time.

2. The method of claim 1, further comprising:
   monitoring the user-initiated changes that convert goal tokens to account balance or account balance to goal tokens over time; and
   detecting deviations from the token conversion schedule based on the monitoring, wherein the detected deviations are used to generate the modified token conversion schedule.

3. The method of claim 2, further comprising:
   predicting a probability of achieving the goal by the goal date based on the detected deviations, wherein the modified token conversion schedule is generated when the predicted probability is below a threshold.

4. The method of claim 3, wherein the predicting is performed by a machine learning model trained by historic historical data comprising goal features, user features, account features, and goal outcomes.

5. The method of claim 1, wherein generating the token conversion schedule further comprises:
   generating multiple candidate token conversion schedules based on features of the account and features of the user; and
   selecting one of the multiple candidate token conversion schedules, wherein the automatically converting account balance to goal tokens over time is performed according to the selected token conversion schedule.

6. The method of claim 5, wherein one or more rules are defined for selecting the one of the multiple candidate token conversion schedules, wherein at least one rule defines that a candidate token conversion schedule with an earliest goal date is selected.

7. The method of claim 5, further comprising:
   simulating, for each candidate token conversion schedule, an account balance for the account over time and a token amount over time; and
   selecting one of the multiple candidate token conversion schedules based on the simulated account balance over time.

8. The method of claim 7, wherein one or more rules are defined for selecting the one of the multiple candidate token conversion schedules, wherein at least one rule defines that a candidate token conversion schedule with an earliest goal date that meets a minimum simulated account balance over time is selected.

9. The method of claim 1, wherein the data structure manages token balances for multiple sets of active tokens in the account, each set of tokens having data fields in the data structure that define a token balance and a user goal or notation for the set of tokens.

10. The method of claim 1, wherein tokens comprise non-monetary assets that are reserved outside the account balance that is available to a user.

11. The method of claim 1, further comprising:
   in response to a triggering event of the account balance falling below a defined threshold, automatically converting a specified amount of tokens back to account balance.

12. A computer-readable storage medium storing instructions that, when executed by a computing system, cause the computing system to simulate a goal state using token conversions, the process comprising:
   receiving goal information comprising an amount and a goal date criteria;
   generating, by an automated agent, a token conversion schedule comprising a goal date and multiple instances of goal token conversions based on the goal information, features of an account, and features of a user, wherein the features of the account comprise at least changes to the account balance over time and the features of the user comprise at least an aggregate account balance for the user across multiple accounts;
   performing, by the automated agent, conversions of account balance to tokens by automatically performing updates to a data structure that manages, for the account, a number of tokens in the account;
   receiving user-initiated changes that convert goal tokens to account balance or account balance to goal tokens; and generating, by the automated agent using a trained machine learning model, a modified token conversion schedule that comprises a modification to the goal date based on the user-initiated changes, wherein the machine learning model is trained using historical data representative of: a) past token conversion schedules, and b) outcomes for the past token conversion schedules, and the modified token conversion schedule is displayed as a graph comprising goal token amounts over time.

13. The computer-readable storage medium of claim 12, wherein the process further comprises:
monitoring the user-initiated changes that convert goal tokens to account balance or account balance to goal tokens over time; and
detecting deviations from the token conversion schedule based on the monitoring, wherein the detected deviations are used to generate the modified token conversion schedule.

14. The computer-readable storage medium of claim 12, wherein the data structure manages token balances for multiple sets of active tokens in the account, each set of tokens having data fields in the data structure that define a token balance.

15. The computer-readable storage medium of claim 12, wherein tokens comprise non-monetary assets that are reserved outside the account balance that is available to a user.

16. A computing system for simulating a goal state using token conversions, the system comprising:
one or more processors; and
one or more memories storing instructions that, when executed by the one or more processors, cause the computing system to perform a process comprising:
receiving goal information comprising an amount and a goal date criteria;
generating, by an automated agent, a token conversion schedule comprising a goal date and multiple instances of goal token conversions based on the goal information, features of an account, and features of a user, wherein the features of the account comprise at least changes to the account balance over time and the features of the user comprise at least an aggregate account balance for the user across multiple accounts;
performing, by the automated agent, conversions of account balance to tokens by automatically performing updates to a data structure that manages, for the account, a number of tokens in the account;
receiving user-initiated changes that convert goal tokens to account balance or account balance to goal tokens; and
generating, by the automated agent using a trained machine learning model, a modified token conversion schedule that comprises a modification to the goal date based on the user-initiated changes, wherein the machine learning model is trained using historical data representative of: a) past token conversion schedules, and b) outcomes for the past token conversion schedules, and the modified token conversion schedule is displayed as a graph comprising goal token amounts over time.

17. The method of claim 1, wherein the historical data, used to train the machine learning model, represents past token conversion schedules and outcomes for the past token conversion schedules across a plurality of user accounts that span a plurality of users.

18. The computer-readable storage medium of claim 12, wherein the historical data, used to train the machine learning model, represents past token conversion schedules and outcomes for the past token conversion schedules across a plurality of user accounts that span a plurality of users.

19. The computer-readable storage medium of claim 13, wherein the process further comprises:
predicting a probability of achieving the goal by the goal date based on the detected deviations, wherein the modified token conversion schedule is generated when the predicted probability is below a threshold.

20. The computer-readable storage medium of claim 19, wherein the predicting is performed by a machine learning model trained by historical data comprising goal features, user features, account features, and goal outcomes.

* * * * *